United States Patent [19]
Mortazavi et al.

[11] Patent Number: 6,164,954
[45] Date of Patent: Dec. 26, 2000

[54] HIGH PRESSURE INJECTION NOZZLE

[75] Inventors: Ali R. Mortazavi, Richmond Hill; Rui M. M. Novo, Toronto, both of Canada

[73] Assignee: Husky Injection Molding Systems Ltd., Canada

[21] Appl. No.: 09/207,042

[22] Filed: Dec. 8, 1998

[51] Int. Cl.[7] .................................................. B29C 45/20
[52] U.S. Cl. ..................................... 425/549; 264/328.15
[58] Field of Search ........................ 425/549; 264/328.15

[56] References Cited

U.S. PATENT DOCUMENTS

| | | | |
|---|---|---|---|
| 4,746,635 | 5/1988 | Inoue et al. | 501/56 |
| 5,208,052 | 5/1993 | Schmidt et al. | 425/549 |
| 5,299,928 | 4/1994 | Gellert | 425/190 |
| 5,569,475 | 10/1996 | Adas et al. | 425/549 |
| 5,658,604 | 8/1997 | Gellert et al. | 425/549 |

OTHER PUBLICATIONS

Brochures of Dynamic–Ceramic Ltd. (visited Nov. 12, 1998) www.dynacer.co.uk/matsprops.htm.

*Primary Examiner*—Tim Heitbrink
*Attorney, Agent, or Firm*—Fitzpatrick, Cella, Harper & Scinto

[57] ABSTRACT

Injection nozzle apparatus comprises inner and outer body portions. The inner body portion includes a melt channel and the outer body is made of a pressure resistant material. The ratio between the inner diameter of the outer body portion and the outer diameter of the inner body portion is selected so that a pre-load or a load is generated when assembling the outer body over the inner body. Preferably the assemble of the two bodies is removably fastened to an injection nozzle body. Preferably the inner body comprises a material with wear resistant characteristics to withstand abrasive or corrosive molten materials. The apparatus of the present invention is particularly useful in molding machines and hot runner nozzles for high pressure molding of various materials at normal or elevated injection temperatures.

69 Claims, 5 Drawing Sheets

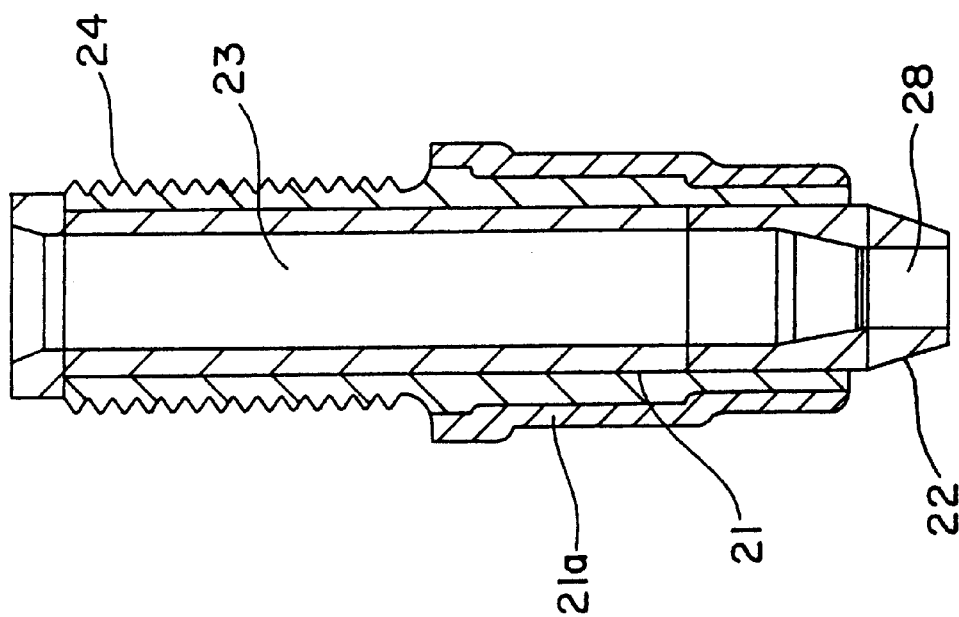
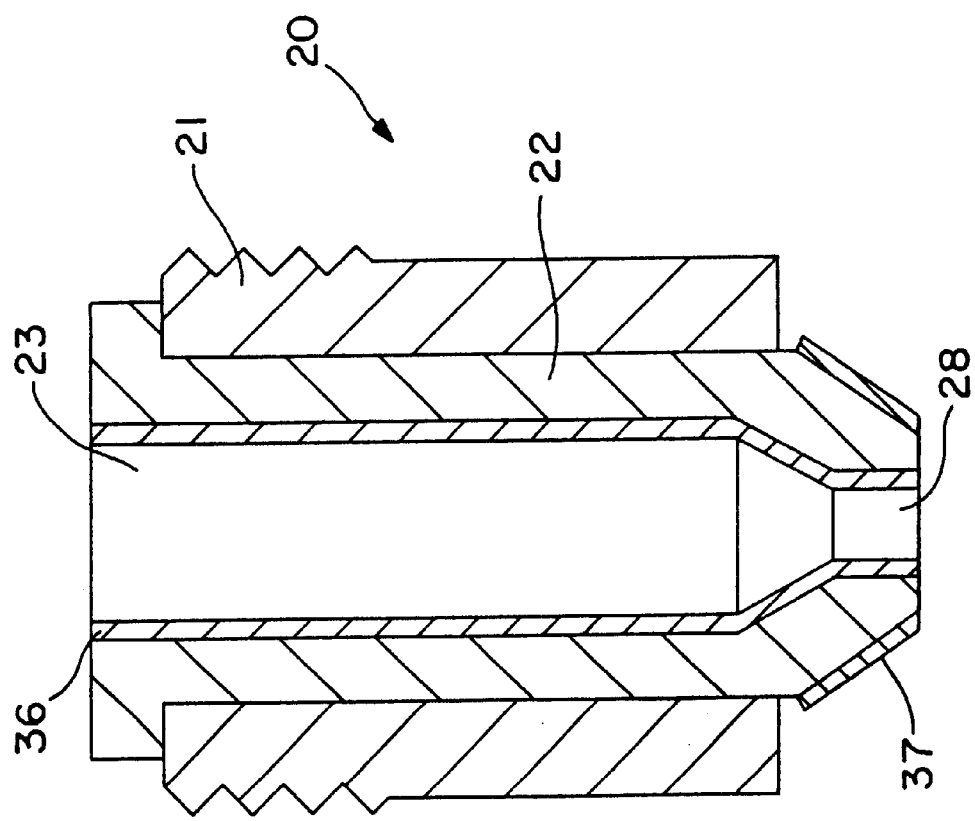
FIG. 8
FIG. 7

HIGH PRESSURE INJECTION NOZZLE

BACKGROUND OF THE INVENTION

1. Field of the Invention

This invention relates to the field of injection apparatuses used, for example, in injection molding for various applications. More particularly, the invention relates to injection nozzles used in high pressure molding of various materials at normal or elevated injection temperatures.

2. Description of the Related Art

Injection nozzles find application in a wide variety of molding machine and hot runner equipment.

U.S. Pat. No. 5,208,052 to Schmidt and U.S. Pat. No. 5,299,928 to Gellert disclose removable two-piece nozzle tips. The '052 patent discloses a removable nozzle tip made of beryllium copper having high thermal conductivity surrounded by a thermally insulating sleeve of titanium alloy, where the insulative sleeve also seals. The '928 patent discloses a similar two-piece nozzle tip made of different materials having only a different geometry. Again, one piece is of high thermal conductivity and the other piece is of low thermal conductivity, where the insulative piece also seals against plastic leaking.

U.S. Pat. No. 5,658,604 to Gellert et al. discloses a hot runner injection nozzle. The '604 patent discloses a two-piece nozzle tip where the inner portion is molded of a carbide alloy that makes it suitable for applications involving injecting of abrasive materials. This tip has a specific shape that, according to the patent, optimizes its manufacturing method. As in patent '928, a threaded sleeve made of a thermal insulation material is used to attach this carbide tip to the nozzle housing. As in patent '928, this insulation sleeve seals the mold gate to prevent leakage of molten resin.

U.S. Pat. No. 5,569,475 to Adas et al. discloses a hot runner nozzle design where a thermal insulation layer, and in some cases an additional protective layer, are applied in the areas of contact between a nozzle and a mold to limit the heat transfer. The role of the protective layer is to increase the life time of the thermal insulation layer.

However, the injection nozzle apparatuses disclosed in these patents are not suitable for high pressure injection of normal, abrasive or corrosive materials, such as various plastic resins or metals.Currently, many applications involve molding abrasive and non-abrasive materials, such as plastic resins or various metals under higher pressure (such as 50 ksi) that can be injected at either normal or at elevated temperature, such as for example up to (600–800 F). These conditions require improved injection nozzles capable of supplying molten material for quality molded parts made during longer injection runs. Preferably, the nozzles are easily removable for faster assembling and servicing. Injection nozzles for high pressure applications meeting these operational criteria in a satisfactory manner are needed. High cavitation applications impose an additional requirement, namely, a space constraint. For this reason, the diameter of the high pressure nozzles must be very small to reduce the pitch between the nozzles. This means that the components of the nozzle must have thin walls, and this limits the application of the known designs to high pressure molding.

SUMMARY OF THE INVENTION

One object of the invention is to create an injection nozzle apparatus with improved performance during high pressure injection molding.

Another object of the invention is to create an injection nozzle apparatus useful for injection molding abrasive materials.

Another object of the invention is to create an injection nozzle apparatus useful for injection molding corrosive materials.

Another object of the invention is to create an injection nozzle apparatus useful for molding abrasive materials under high pressure.

Another object of the invention is to create an injection nozzle apparatus useful for injection molding abrasive materials under high pressure at normal and very high molding temperatures.

Another object of the invention is to create an injection nozzle apparatus that has relatively thin walls to accommodate several units in a mold and displays improved pressure resistance, high thermal conductivity, high wear resistance, and operates at high temperatures.

It is a further object of the invention to provide an injection mold or an injection molding machine including the improved injection nozzle apparatus.

It is a further object of the invention to provide a method of manufacturing and assembling an injection nozzle apparatus according to the invention.

To these ends, one aspect of the invention comprises an injection nozzle apparatus including inner and outer bodies (portions) made of materials having different characteristics. For example, the outer body is made of a material having higher pressure resistance than the material of the inner body. According to an aspect of the invention the inner body (portion) encompasses a melt channel, and an outer surface of the inner body has a diameter D1. The outer body (portion) has an inner diameter D2. According to the current invention, the ratio between D2 and D1 is selected to create a compressive load or a pre-load at the interface between the inner and the outer bodies. The compressive load or pre-load can be achieved in a number of ways, including press fitting the inner and outer bodies at room temperature, shrink fitting at room temperature, and thermal expansion at molding temperature.

Also according to this aspect of the invention, the inner portion is made of a thermally conductive and wear resistant material, such as carbide or tungsten carbide sleeves, or is made of a sleeve and a wear resistant coating. The outer portion includes a high pressure-resistant material, such as steel, TZM, or AerMet.

According to another aspect of the invention, the apparatus further includes a thermal insulator means disposed adjacent to the outer portion. In one example, a thermal insulative coating material may be deposited on the outer portion. In another example this sleeve may be also used as a thermal insulator.

Also according to another aspect of the invention, the apparatus may include an outer body made of a high pressure resistant material that further includes a portion for sealing or aligning the mold gate area.

In another aspect, the invention is directed to an injection molding device including a mold with a gate area, and a nozzle assembly for delivering molten material through the mold gate area. The nozzle assembly includes an inner body portion of diameter D1, including a melt channel removably aligned with an opening in the mold through which melt material passes. The nozzle assembly also includes an outer body portion of inner diameter D2. In one embodiment, D2 is less than D1.

In another aspect, the invention is directed to methods of manufacturing an injection nozzle apparatus for high pressure molding. According to one embodiment, the method includes a step of providing an inner body portion of outer diameter D1 having a melt channel provided therein. The method also includes a step of providing an outer body portion of inner diameter D2, D2 being less than the outer diameter D1. Finally, the method also includes assembling the outer body portion over the inner body portion at room temperature to create an interference fit inducing a compressive pre-load on the inner body portion. This pre-load ensures that even though the inner and outer bodies (portions) have relatively thin walls to accommodate several injection units in a limited space within the mold, the two bodies will withstand the high injection pressure.

According to another aspect, the invention is directed to a method of manufacturing an injection nozzle apparatus. The method includes steps of manufacturing an inner body portion of outer diameter D1 with a melt channel provided therein, manufacturing an outer body portion of inner diameter D2, D2 being less than the outer diameter D1, and press-fitting the outer body portion over the inner body portion by pressing to create an interference fit inducing a compressive preload on the inner body portion.

In another aspect, the invention encompasses an injection nozzle for high pressure molding where two sleeves made of materials having different thermal conductivity characteristics are shrink-fit at room temperature. The outer sleeve is heated at a temperature higher than the operation temperature and is then placed over the inner sleeve. During cooling at room temperature the outer sleeve shrinks over the inner sleeve and thus generates the desired pre-load. This pre-load is maintained at the operation temperature.

In yet another aspect, the invention encompasses an injection nozzle for high pressure molding where two sleeves made of materials having different thermal characteristics are assembled together at room temperature with minimal or negligible pre-load as they have substantially the same inner and outer diameters. The pressure load needed for the nozzle is achieved in operation at substantially the molding temperature where the inner material expands more than the outer material and thus generates a pressure load at their interface.

In summary, the current invention teaches for the first time a new method of increasing the pressure resistance of thin walled components by creating a preload or a load at the interface between the parts. This invention is thus applicable to many areas, in particular injection nozzles for high pressure applications using various moldable materials, that can be abrasive and/or corrosive at normal and at high molding temperatures.

BRIEF DESCRIPTION OF THE DRAWINGS

FIG. 7 is a cross-sectional view showing another embodiment of the present invention.

FIG. 8 is a cross-sectional view showing another embodiment of the present invention.

DESCRIPTION OF THE PREFERRED EMBODIMENTS

Figure 1:
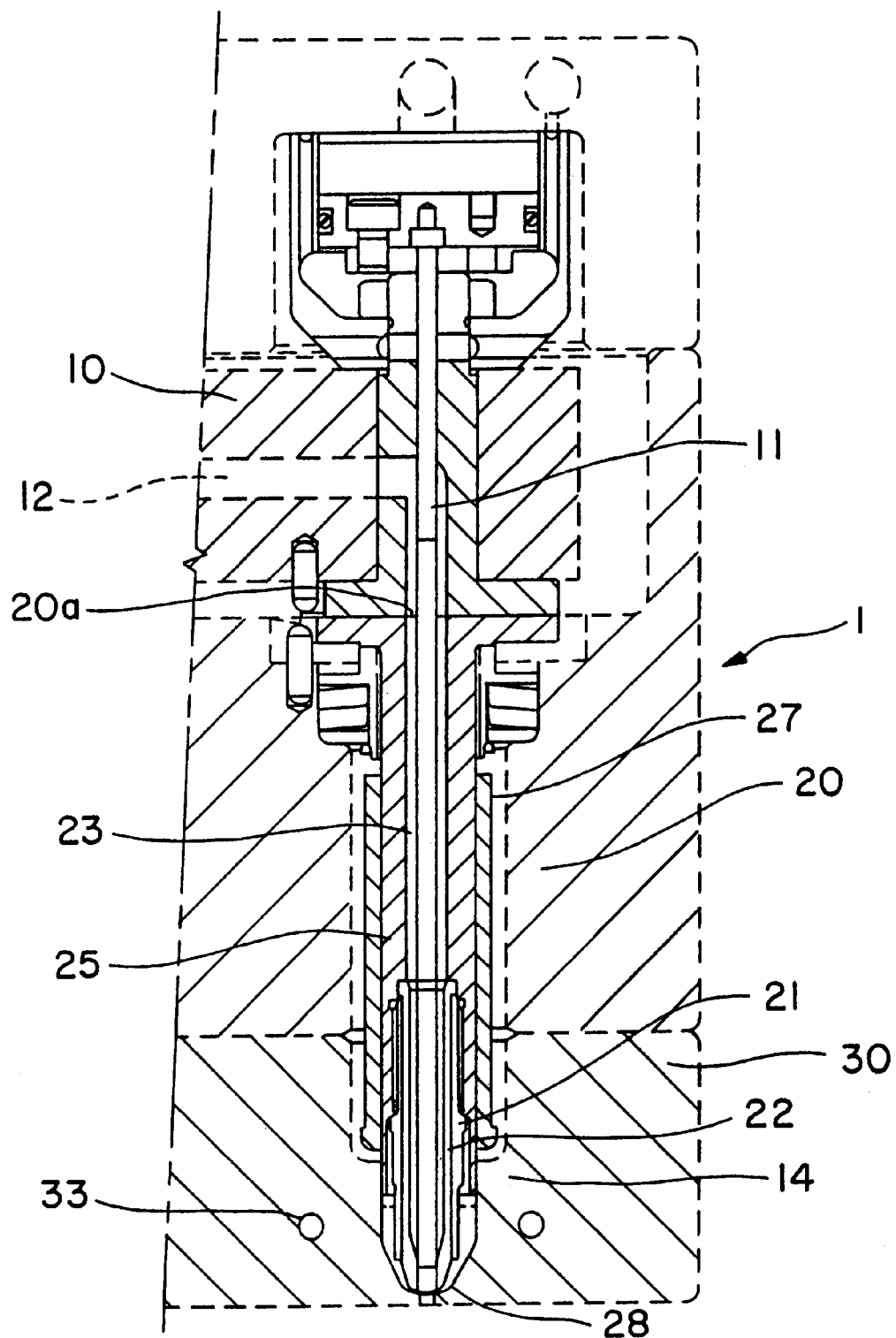
FIG. 1 is a cross-sectional view of a molding apparatus including a nozzle tip apparatus according to an embodiment of the invention.

FIG. 1 illustrates the overall arrangement of molding device 1. The device includes a mold manifold 10, having manifold melt channel 12 through which molten material reaches injection nozzle 20. While FIG. 1 shows valve stem 11 for regulating the flow of material through the melt channel, it should be noted that the current invention may be used with any nozzle configuration including known thermal gating designs. In most applications several nozzles similar to nozzle 20 communicate with a plurality of melt channels 12 to improve productivity. That is, FIG. 1 shows only one part of a mold that may have several nozzles. In order to minimize the overall size of the mold, the injection nozzles must be very small in diameter. This means that nozzle tip apparatus 14 must have a small diameter. To reduce the diameter of the nozzle tip portion, the nozzle tip portion should be "thin-walled."

Nozzle 20 has an opening at its proximal end, or "head portion", identified by reference numeral 20a, for receiving the molten material from the manifold. The nozzle feeds the material through melt channel 23, communicating with manifold melt channel 12, to nozzle tip apparatus 14 at its distal end, having an orifice 28 leading from the melt channel to a mold cavity (not shown). Heater 27, provided along the nozzle, heats nozzle 20 to maintain the material in the melt channel in a molten state. During the molding step, the nozzle injects the molten material through the orifice 28 and a mold gate (not shown) into a mold cavity space (not shown) located in mold plate 30, using known methods. The mold 30 plate includes cooling channels 33 to carry a cooling fluid to cool the mold gate area after each injection step.

The features of nozzle 20, and in particular, nozzle tip apparatus 14, described below, are useful for high pressure injection molding and accommodates the need to use several nozzles within a limited space. In the preferred embodiment, the materials used for, and the assembly of, the apparatus components result in a nozzle tip apparatus of improved durability under high pressure, high temperature molding conditions, and under chemical interaction with the molten material.

Figure 3:
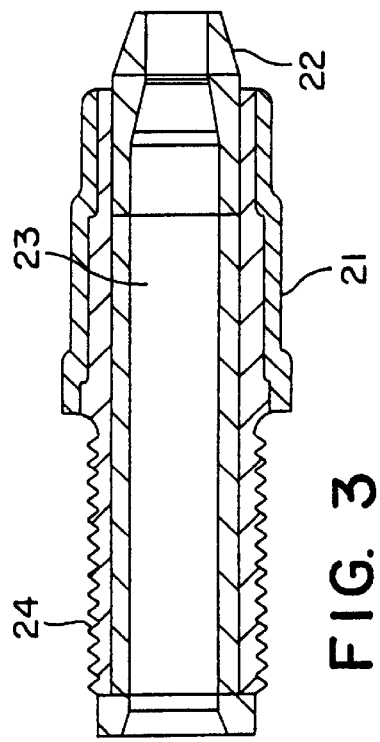
FIG. 3 is a cross-sectional view of the nozzle tip apparatus shown in FIGS. 2a and 2b.
Figure 2B:
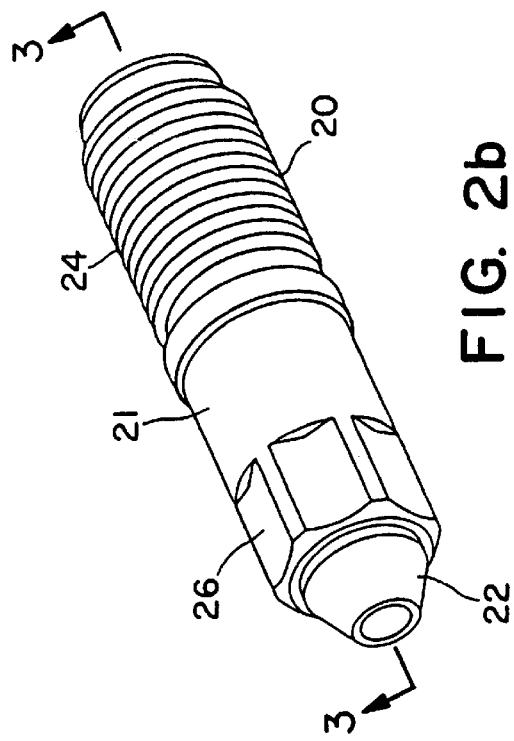
FIGS. 2a and 2b are perspective views of a nozzle tip apparatus according to the embodiment of the invention shown in FIG. 1.
Figure 2A:
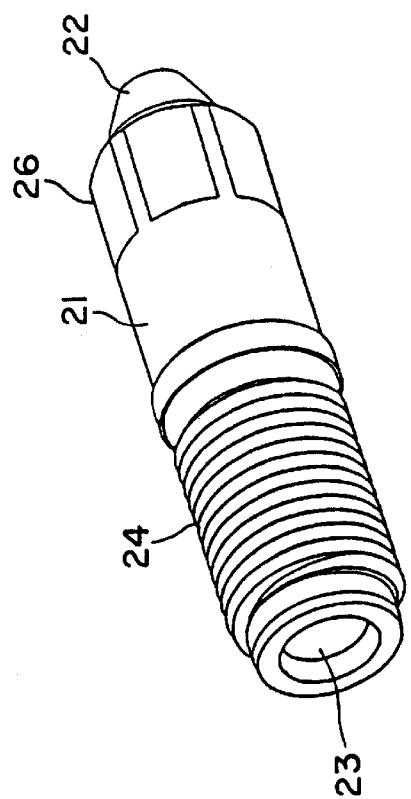

FIGS. 2a, 2b, and 3 illustrate nozzle apparatus 20 in more detail. The nozzle apparatus includes an outer portion 21 surrounding at least part of an inner portion 22. The two portions are coaxial, generally tubular structures having substantially thin walls. The inner portion tapers in a generally conical fashion at the end nearest orifice 28. Melt channel 23 formed within the inner portion guides molten material from the head portion 20a to the mold cavity space in the mold plate 30. The melt channel ends with a single orifice 28 at the tip end of the nozzle. Various tip end configurations can be successfully used in conjunction with the current invention, such as, for example, edge gating, torpedo, mixer, or divert and the flow of molten material can be regulated using either mechanical or thermal means.

Materials used for outer portion 21 preferably exhibit high pressure resistance and good thermal conductivity. Materials having both characteristics include steel, TZM (Ti/Zr-carbide manufactured by Plansee), AerMet 100 ®, from Carpenter Technology Corp. of Reading, Pa., or other materials having similar or better characteristics. AerMet alloy, particularly AerMet 100, demonstrates a favorable combination of strength and fracture toughness among commercial UHS steel. Using AerMet 100 prevents premature cracking or breaking under heavy load or impact. Also AerMet®-for-Tooling alloy can be heat treated to 280–300 ksi tensile strength while exhibiting Charpy-V-notch in excess of 30 ft-lbs at HRC 54. It is fully hardenable, and virtually free of distortion when heat treated. The importance of very low distortion, becomes important with critical size tolerances such as those required in the current invention for the diameters of the nozzle bodies.

In one embodiment, outer body 21 includes a fastening or connecting portion. For example, FIGS. 2a, 2b, and FIG. 3 illustrate threaded area 24 located on a portion of the outer surface of outer body 21. The nozzle apparatus fastens to nozzle housing 25 (shown in FIG. 1) surrounding the nozzle using threading 24. Hex portion 26 formed on the outer surface of the outer portion facilitates fastening and unfastening the nozzle tip apparatus from the nozzle housing.

Materials used for the inner portion 22 preferably exhibit high wear resistance and excellent thermal conductivity. Materials having suitable wear resistance in contact with the molten material and thermal conductivity characteristics include, among others, carbide and tungsten carbide and various ceramics which display wear resistance and acceptable thermal conductivity.

Suitable manufacturing methods for the inner portion made of carbides include powder injection molding or other known manufacturing methods. Manufacturing the inner portion requires accurately machining outer diameter D1 to a precise tolerance to create the interference fit required to induce the necessary pre-load in assembling the two portions 21 and 22.

According to one embodiment of the current invention, the outer portion of the nozzle has an inner diameter D2 that is slightly smaller than the outer diameter D1 of the inner portion. As mentioned above, this creates an interference fit between the two pieces when assembled together. This interference fit places a compressive pre-load upon the inner portion from the pressure of the outer portion. This compressive pre-load counteracts the outward pressure on the inner portion created by the injection pressure. This reduces the total stress on the inner portion, because the total stress experienced by the inner portion is the algebraic sum of the injection pressure exerting a force radially outward against the inner surface of the inner portion and compression force exerted radially inward on the outer surface of the inner portion by the fitted outer portion. The pre-load makes thus possible to make the two portions 21 and 22 with relatively thin walls and to use the two assembled pieces for high injection pressure.

According to the instant invention the load or pre-load between the inner and the outer bodies can be created in at least three ways. In one method, called according to the invention press-fit, the outer body 21 has diameter D1 smaller than the outer diameter D2 of inner body 22. A pre-load is generated at the interface between these portions according to the invention by pressing, at room temperature, outer body 21 over inner body 22. In a second method, outer body 21 is heated to increase its inner diameter, and then is assembled at room temperature over inner body 22. During cooling at room temperature, the outer body shrinks, generating the interference fit or pre-load at the interface with the inner body. This method is called according to this invention shrink-fit. A third method creates a load at the interface between 21 and 22 by making inner body 22 of a material having higher thermal expansion coefficient than outer body 21. The inner and outer diameters of body 21 and 22 are almost equal so that they can be assembled at room temperature. The outer body applies almost no pre-load on the inner body at room temperature. In operation, as the temperature rises before and during injection, the inner and outer bodies expand at different rates so that the outer body, which expands less than the inner body, exerts a pre-load on the inner body during the molding process.

Accordingly, in some applications the pressure load generated at the interface between the two bodies creates an assembly that withstands high pressure injection.

This novel design and method of inducing a pressure load in high temperature molding operation may be achieved by many combinations of materials with different thermal expansion coefficients. As an example, the inner portion may be made of a thermally conductive carbide and the outer portion may be made of a variety of pressure resistant materials, such as AerMet, or a similar combination. In some applications the outer body can be made of Inconel 600 or Inconel 690 material, which is known in the high pressure reactor vessels art and. applications. Inconel is a registered trade mark of the INCO family of companies and is supplied in various forms (tube or rod) by High Performance Alloys, Inc. of Tipton, Ind. Inconel alloy 600 is nickel-chromium alloy designed for use from cryogenic to elevated temperatures (up to 2000 deg. F). It has excellent mechanical properties and high strength. It resists to a wide range of abrasive and corrosive media.

In another embodiment of the invention, the inner body is made of a high thermally conductive material such a BeCu 25 that has an inner coating or layer made of a wear resistant material selected from a group consisting of nickel, molybdenum, titanium and tungsten carbide. The inner layer could be also made of ceramics such as alumina, zirconia, silicon carbide, silicon nitride and boron carbide. These materials are commercially available and can be applied using various techniques, as described in the brochures of Dynamic-Ceramic Ltd. located in Crewe, UK. A useful high strength and high hardness material that can be used for the inner body is a sintered ceramic made of alumina-zirconia-silicon (in certain proportions), as disclosed in the U.S. Pat. No. 4,746,635 to Inoue et al. As discussed above, the inner body must have a high thermal expansion coefficient. The outer body is made of a high pressure material that has a lower thermal expansion coefficient. This combination of materials for the two bodies is capable of creating a pressure load through different thermal expansion when they are assembled together and used in an injection nozzle apparatus.

In conclusion, the current invention provides at least three methods of making a multiple piece nozzle apparatus for high pressure molding, preferably a two-piece assembly, where the outer portion places a compressive preload on the entire inner portion. The magnitude of the preload depends on the degree of interference between the inner and outer portions. The appropriate interference between the inner and outer portions will depend on the materials selected for each portion and can be calculated by a person skilled in the art. For example, if the inner portion is carbide and the outer portion is TZM, the interference may be, for example, in the range of 0.02 to 0.03 mm. Because of the difference in thermal expansion of the Aermet and carbide, a larger preload should be placed on the carbide to ensure that in the hot condition, the interference fit is still present. For example, the interference between an inner carbide portion and an outer Aermet portion may be for example in the range of 0.06 to 0.07 mm before heating.

Other considerations in shrink fitting the outer portion to the inner portion include the difference in temperature required for assembly, resistive holding torque of the inner portion, and the pressure at the interface between the outer surface of the inner portion and the inner surface of the outer portion. In addition, more general considerations include the effect of the preload on the tip, that is, the torque/force required to seat the tip, thermal stresses caused by the raising the nozzle assembly to the required operating temperature, and the stiffness of the nozzle housing.

Optimizing the performance of the nozzle tip assembly also requires selecting an appropriate melt channel diameter as well as an appropriate ratio between the diameters D1 and D2. The melt channel must be sized to withstand a pressure drop through the nozzle tip assembly, and to meet the flow requirements for the intended application. For example, the melt channel may have a diameter of 7.00 mm when the injection pressure is 50 ksi. With these parameters, the stress on the inner portion will vary along the inner portion on the inner and outer surfaces of the straight and the tapered sections of the inner portion. In addition, the ratio between the diameters D1 and D2 must be selected to withstand high injection molding pressures of about 50 ksi at high temperatures of about 600–800 degrees F.

As mentioned before, according to this invention the nozzle tip 14, even though is made of two pieces connected together, can be regarded as one piece made of two different materials where a pressure pre-load or a pressure load is at the interface between the two materials. This design approach helps the service and assembly operations as the nozzle tip can be easily connected to the nozzle 20 through any useful means such as a thread.

Figure 4:
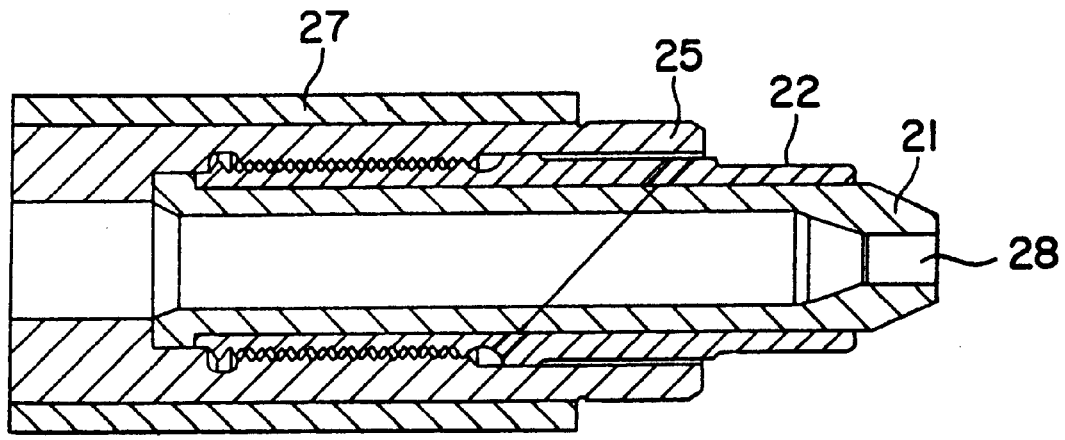
FIG. 4 is a cross-sectional view of the molding apparatus according to the present invention.

FIG. 4, illustrates a cross section through an injection nozzle according to the invention. External heater 27 surrounds the nozzle housing 25 to maintain the material flowing in the melt channel molten. Other embodiments of the nozzle tip apparatus include apparatuses having a different geometry of the inner body 21, such divert, torpedo or edge gating.

Figure 5:
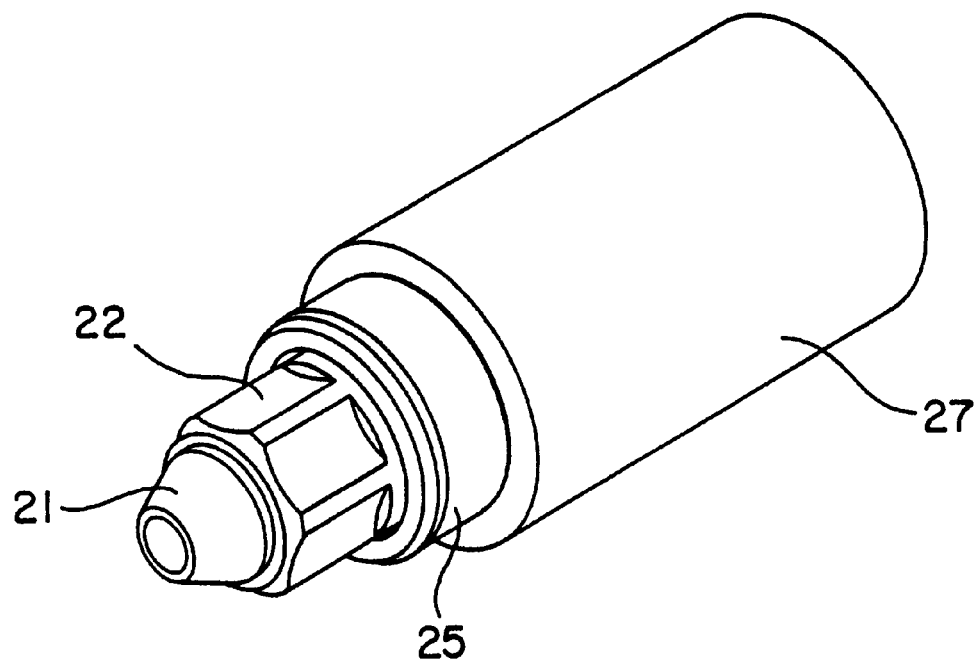
FIG. 5 is a perspective view of the embodiment shown in FIG. 4.

The invention of FIG. 4 is further shown in a perspective view in FIG. 5 that indicates the compactness and easy assembly of this high pressure resistant nozzle design.

Figure 6:
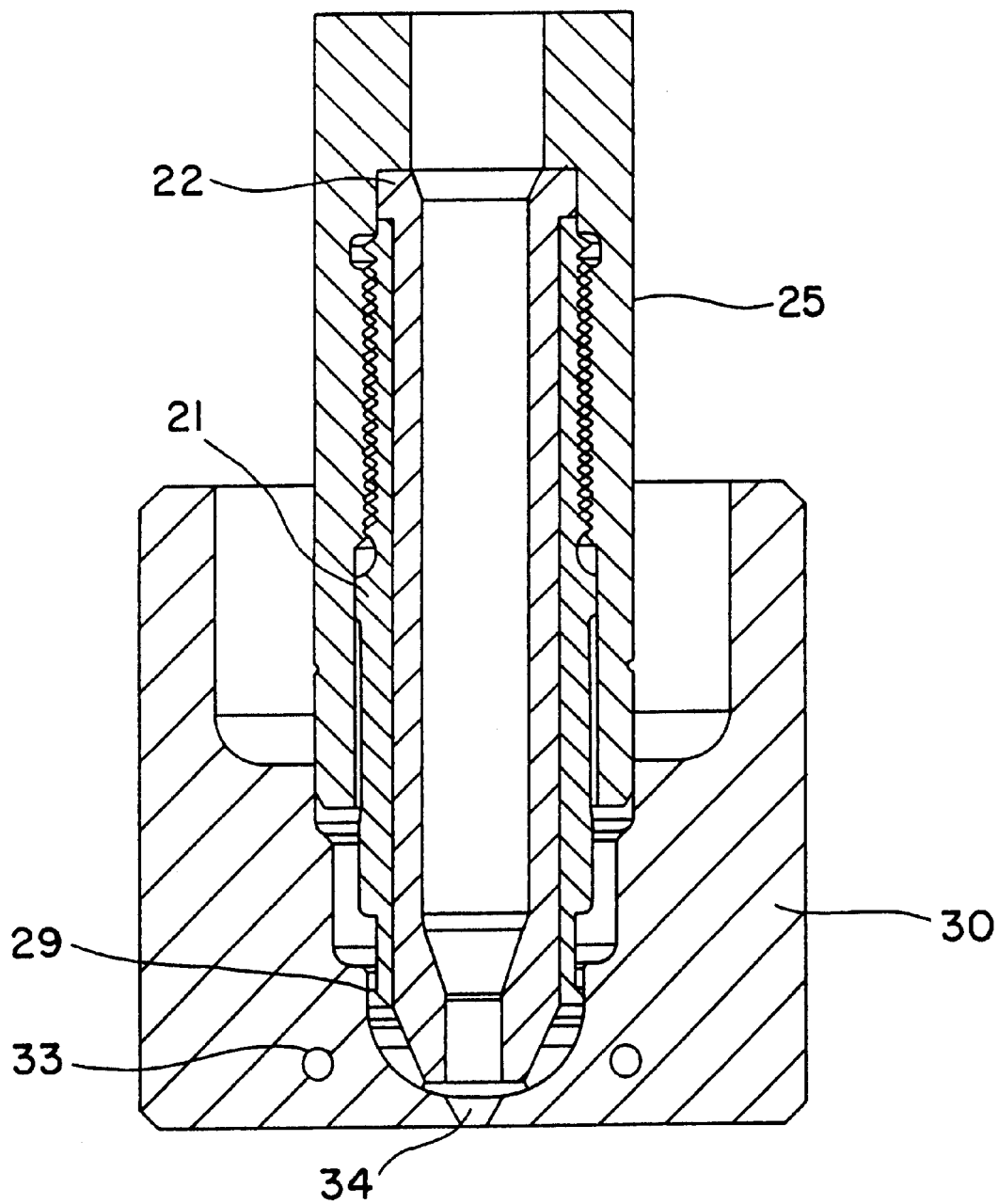
FIG. 6 is a cross-sectional view showing another embodiment of the present invention.

FIG. 6 illustrates another embodiment of the invention. In this embodiment, the outer body 21 has additional functions not taught in the prior art. Besides making body 21 of a high pressure resistant material that is also preferably a good thermally conductive material, body 21 generates the pressure load or pre-load when assembled with inner body 22. In some applications outer body 21 includes a sealing portion 29, illustrated in the embodiment of FIG. 5. This sealing portion limits the size of the bubble created during injection so that it does not leak beyond sealing portion 29. This porion 29 can be also used to align the entire nozzle with respect to the mold gate 34. In some applications a thermal insulative coating is applied on the outer surface of outer body 21. This design is different from the design shown in U.S. Pat. No. 5,299,928 to Gellert because according to this invention bodies 21 and 22 are made of thermally conductive materials, and outer body portion 22 is made of a high pressure resistant material. The two pieces 21 and 22 are held together by an interference fit, so that they are assembled and removed together (as one piece) from the nozzle. Sealing portion 29 shown in FIG. 6 facilitates alignment of nozzle 20 in mold 30. Sealing portion 29 comprises a flange-like or shoulder portion at the distal end of outer portion 21. This portion fits snugly against mold 30 to seal the mold gate 34 against leakage by the molten material. As shown in FIG. 6, there is no contact between the nozzle housing 25 and the bore 32 of the mold plate 32.

FIG. 7 shows another embodiment of the invention where inner body 22 is a thin sleeve made of a thermally conductive material such as for example BeCu 25. A thin layer, film or coating 36 made of a high wear resistant material is applied inside body 22. As mentioned, the outer body 21 is made of a high pressure resistant material. According to the invention a pre-load or a load is induced between the two bodies 21 and 22. This design is useful when less abrasive materials are injected under high pressure through the nozzle. The wear resistant coating could be made of zirconia, alumina, and other ceramics. In this embodiment, a thermal insulating coating 37 is applied around the nozzle tip 20 close to the nozzle orifice 28. Preferentially the thermal insulating coating on the nozzle is made of ceramics such as alumina, zirconia, titanium oxide, or aluminum titanate of various thicknesses up to 50 microns.

The wear resistant and thermal insulating coatings can be applied using known techniques such as physical vapor deposition (PVD), chemical vapor deposition (CVD), thermal/flame or plasma spraying. The method of coating depends on the coating material, the substrate and the needed thickness.

FIG. 8 illustrates another embodiment of the invention. As in the other embodiments, this embodiment includes outer portion 21 and inner portion 22. Surrounding outer portion 21 is a thermal insulative layer 21a that insulates outer portion 21 against heat loss during the cooling step of the mold gate area. Any thermal insulative material mentioned before can be used with this embodiment. Preferably, the thermal insulating coating on the nozzle is made of a ceramic such as alumina, zirconia, titanium oxide, or aluminum titanate of various thicknesses that may be more than 50 microns. Also the insulative layer could be also made of silicon carbide, silicon nitride, and boron carbide. These materials are commercially available and can be applied using various techniques, as described in the brochures of Dynamic-Ceramic Ltd. located in Crewe, UK.

While the invention has been described herein with respect to what are presently considered the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

We claim:

1. An injection nozzle apparatus comprising:
   an inner body portion including a melt channel, said inner body portion having an outer diameter D1; and
   an outer body portion, said outer body portion inducing a compressive pre-load on said inner body portion when said outer body portion is assembled on said inner body portion.

2. An injection nozzle apparatus according to claim 1, wherein, before said outer body portion is assembled on said inner body portion, said outer body portion has an inner diameter D2, D2 being less than the outer diameter D1.

3. An injection nozzle apparatus according to claim 1, said inner body portion comprising a thermally conductive material.

4. An injection nozzle apparatus according to claim 1, said inner body portion comprising a wear resistant material.

5. An injection nozzle apparatus according to claim 1, said inner body portion comprising a thermally conductive, wear resistant material.

6. An injection nozzle apparatus according to claim 1, said inner body portion comprising carbide.

7. An injection nozzle apparatus according to claim 1, said inner body portion comprising tungsten carbide.

8. An injection nozzle apparatus according to claim 1, said outer body portion comprising a pressure- resistant material.

9. An injection nozzle apparatus according to claim 1, said outer body portion comprising a thermally conductive material.

10. An injection nozzle apparatus according to claim 1, said outer body portion comprising steel.

11. An injection nozzle apparatus according to claim 1, said outer body portion comprising Ti/Zr-Carbide.

12. An injection nozzle apparatus according to claim 1, said outer body portion comprising an iron-based steel alloy.

13. An injection nozzle apparatus according to claim 1, said outer body portion comprising a fastening portion, said fastening portion removably fastening said injection nozzle apparatus to a housing of a hot runner injection nozzle.

14. An injection nozzle apparatus according to claim 13, said fastening portion comprising a threaded portion.

15. An injection nozzle apparatus according to claim 1, further comprising an insulator disposed adjacent to said outer body portion.

16. An injection nozzle apparatus according to claim 15, said insulator comprising an insulative coating material deposited on said outer body portion.

17. An injection nozzle apparatus according to claim 15, said insulator contacting a gate area of a mold thereby sealing an interface between said injection nozzle apparatus and the mold.

18. An injection nozzle apparatus according to claim 1, further comprising a heater thermally contacting said outer body portion, heat from said heater being conducted to melt material to maintain a molding temperature.

19. An injection nozzle apparatus according to claim 1, further comprising a wear-resistant coating disposed on said inner body portion.

20. An injection nozzle apparatus according to claim 1, said inner body portion comprising a wear resistant material.

21. An injection molding apparatus according to claim 1, said outer body portion comprising a flange, said flange sealing and aligning said nozzle apparatus with the mold.

22. An injection nozzle apparatus comprising:
inner means for conveying melt material, said inner means including melt channel means for guiding the melt material to a mold, said inner means having an outer diameter D1; and
outer means for surrounding said inner means, said outer means inducing a compressive pre-load on said inner means when said outer means is assembled on said inner means.

23. An injection nozzle apparatus according to claim 22, wherein, before said outer means is assembled on said inner means, said outer means has an inner diameter D2, D2 being less than the outer diameter D1.

24. An injection nozzle apparatus according to claim 22, said inner means comprising a thermally conductive material.

25. An injection nozzle apparatus according to claim 22, said inner means comprising a wear resistant material.

26. An injection nozzle apparatus according to claim 22, said inner means comprising a thermally conductive, wear resistant material.

27. An injection nozzle apparatus according to claim 22, said inner means comprising carbide.

28. An injection nozzle apparatus according to claim 22, said inner means comprising tungsten carbide.

29. An injection nozzle apparatus according to claim 22, said outer means comprising a pressure-resistant material.

30. An injection nozzle apparatus according to claim 22, said outer means comprising a thermally conductive material.

31. An injection nozzle apparatus according to claim 22, said outer means comprising steel.

32. An injection nozzle apparatus according to claim 22, said outer means comprising Ti/Zr-Carbide.

33. An injection nozzle apparatus according to claim 22, said outer means comprising an iron-based steel alloy.

34. An injection nozzle apparatus according to claim 22, said outer means comprising fastening means.

35. An injection nozzle apparatus according to claim 34, said fastening means comprising a threaded portion.

36. An injection nozzle apparatus according to claim 22, further comprising insulating means for insulating said inner and outer means, said insulating means being disposed adjacent to said outer means.

37. An injection nozzle apparatus according to claim 36, said insulating means comprising an insulative coating material deposited on said outer means.

38. An injection nozzle apparatus according to claim 36, said insulating means comprising outer fastening means for fastening said insulating means to a nozzle body.

39. An injection nozzle apparatus according to claim 36, said insulating means contacting a gate area of a mold for sealing an interface between said injection nozzle apparatus and the mold.

40. An injection nozzle apparatus according to claim 22, further comprising heating means for conducting heat to the melt material to said outer means for maintaining a molding temperature.

41. An injection nozzle apparatus according to claim 22, further comprising a wear-resistant coating disposed on said inner means.

42. An injection nozzle apparatus according to claim 22, said inner means comprising a wear resistant material.

43. An injection molding apparatus according to claim 22, said outer means comprising a flange, said flange sealing and aligning said nozzle apparatus with the mold.

44. An injection molding device comprising:
a mold with a gate area; and
a nozzle assembly for contacting the opening, said nozzle assembly comprising:
an inner body portion including a melt channel removably aligned with the opening and through which melt material passes, said inner body portion having an outer diameter D1; and
an outer body portion, said outer body portion inducing a compressive pre-load on said inner body portion when said outer body portion is assembled on said inner body portion.

45. An injection molding device according to claim 44, wherein, before said outer body portion is assembled on said inner body portion, said outer body portion has an inner diameter D2, D2 being less than the outer diameter D1.

46. An injection molding device according to claim 44, said inner body portion comprising a thermally conductive, wear resistant material.

47. An injection molding device according to claim 44, said inner body portion comprising carbide.

48. An injection molding device according to claim 44, said inner body portion comprising tungsten carbide.

49. An injection molding device according to claim 44, said outer body portion comprising a pressure-resistant material.

50. An injection molding device according to claim 44, said outer body portion comprising a thermally conductive material.

51. An injection molding device according to claim 44, said outer body portion comprising steel.

52. An injection molding device according to claim 44, said outer body portion comprising Ti/Zr-Carbide.

53. An injection molding device according to claim 44, said outer body portion comprising an iron-based steel alloy.

54. An injection molding device according to claim 44, said outer body portion comprising a fastening portion.

55. An injection molding device according to claim 44, further comprising an insulator disposed adjacent to said outer body portion.

56. An injection molding device according to claim 55, said insulator comprising an insulative coating material deposited on said outer body portion.

57. An injection molding device according to claim 55, said insulator comprising an outer fastening portion.

58. An injection molding device according to claim 55, said insulator contacting a gate area of said mold thereby sealing an interface between said injection nozzle apparatus and said mold.

59. An injection molding device according to claim 44, further comprising a heater thermally contacting said outer body portion, heat from said heater being conducted to melt material to maintain a molding temperature.

60. An injection molding apparatus including:
   a nozzle body in communication with a source of molten material;
   a nozzle tip contacting said nozzle body, said nozzle tip comprising a pressure resistant material;
   a melt channel disposed inside said nozzle tip comprising a wear resistant material protecting said nozzle tip from wear caused by flow of the molten material, said nozzle tip inducing a compressive pre-load on said melt channel.

61. An injection nozzle apparatus according to claim 60, wherein a preload is induced at an interface between the nozzle tip and the melt channel to resist injection pressures.

62. An injection nozzle comprising at least two concentric bodies made of different materials, whereby an outer body induces a compressive load upon an inner body during injection of molten material in a mold cavity and where the inner body comprises a melt channel for guiding the molten material towards the mold cavity.

63. An injection nozzle apparatus according to claim 62, wherein the compressive force is induced through interference fit between said inner and said outer body at room temperature.

64. An injection nozzle apparatus according to claim 62, wherein the compressive force is induced through shrink fit between said inner and said outer bodies at room temperature.

65. An injection nozzle apparatus according to claim 62, wherein the compressive force is induced through relative thermal expansion between said inner and said outer body during an injection molding process.

66. An injection nozzle apparatus comprising:
   an inner body comprising a melt channel for guiding a molten material towards a cavity mold;
   an outer body comprising a material having different characteristics than said inner body and that is coaxial/concentric with said inner body, whereby said outer body induces a compressive load upon said inner body during injection of molten material in a mold cavity.

67. An injection nozzle apparatus according to claim 66, whereby the compressive force is induced through interference fit between said inner and said outer body at room temperature.

68. An injection nozzle apparatus according to claim 66, wherein the compressive force is induced through shrink fit between the inner and the outer bodies at room temperature.

69. An injection nozzle apparatus according to claim 66, wherein the compressive force is induced through relative thermal expansion between said inner and said outer body during an injection molding process.

* * * * *